Dec. 2, 1924.
J. T. BROCKHOUSE
PIVOTED JOINT
Filed Dec. 4, 1923
1,517,612
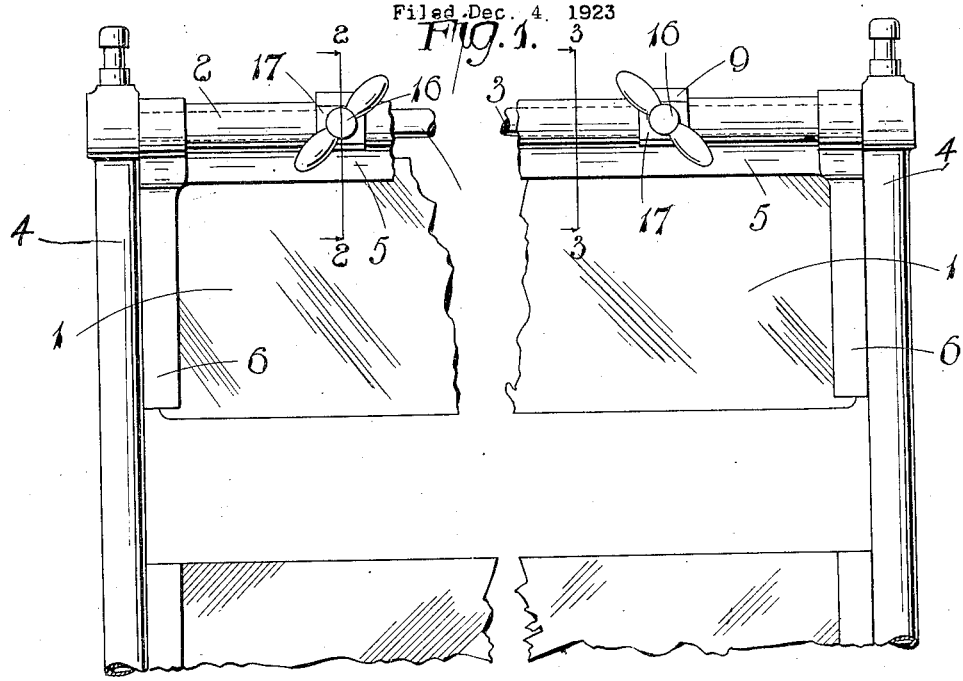
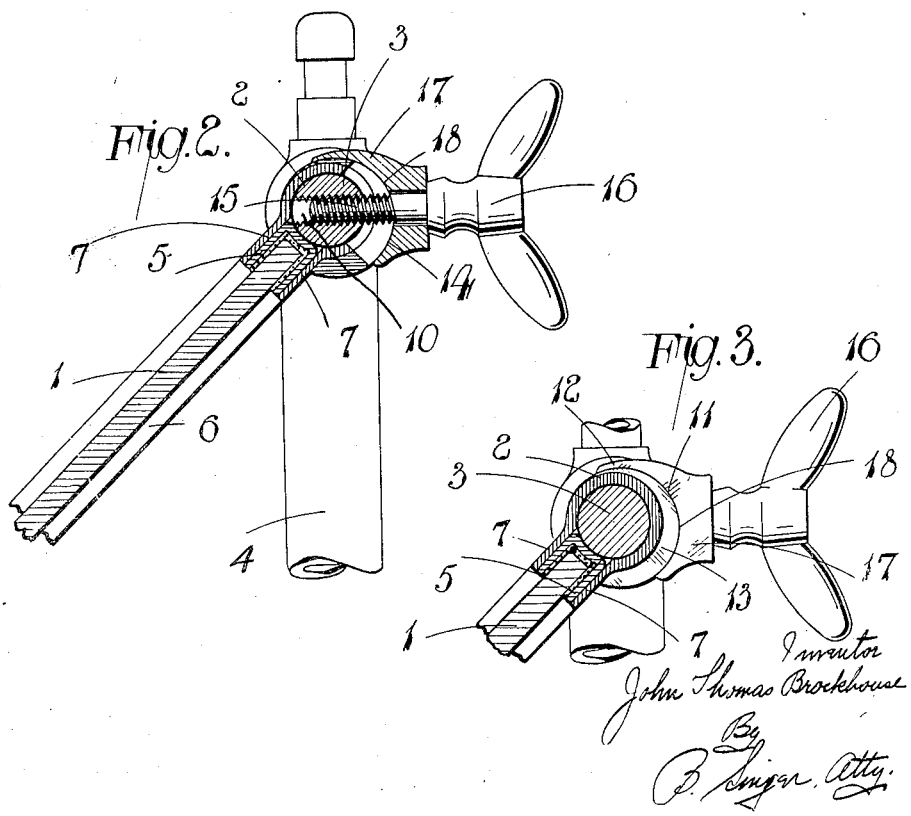
Inventor
John Thomas Brockhouse
By
B. Singer, Atty.

Patented Dec. 2, 1924.

1,517,612

UNITED STATES PATENT OFFICE.

JOHN THOMAS BROCKHOUSE, OF WEST BROMWICH, ENGLAND.

PIVOTED JOINT.

Application filed December 4, 1923. Serial No. 678,545.

*To all whom it may concern:*

Be it known that I, JOHN THOMAS BROCKHOUSE, a subject of the King of Great Britain, residing at Victoria Works, West Bromwich, in the county of Stafford, England, have invented certain new and useful Improvements in Pivoted Joints; and I do hereby declare the following to be a full, clear, and exact description of the same.

This invention relates to pivoted joints and is primarily intended for vehicle wind screens but is also applicable to every case in which a panel such as a window or door is pivoted to a frame or rod so that it can swing in the opening.

Pivoted joints of the kind to which this invention relates comprise two main members which are relatively movable, i. e., they may both be movable or one may be movable and the other stationary.

In the case of the most common application of my invention, i. e., a wind screen for motor vehicles, the movable member is formed by a panel of glass or the like fixed in a frame which swings about one edge, whilst the stationary member is formed by a rod which forms the corresponding side member of the stationary frame and also constitutes a hinge pin about which the panel can swing.

It will be understood that my invention is applicable to wind screens having a single hinged panel at the top or to wind screens wherein there is a panel at the top hinged along its upper edge and a panel at the bottom hinged along its lower edge with or without panels at the sides hinged to the vertical edges.

Primarily, the pivot joint comprises a pivot member, a movable member mounted upon the said pivot member and an adjustable stop co-operating with the pivot and with the movable member to prevent movement of the latter in one direction but allow it to be moved in an opposite direction.

More specifically, the pivot member and the movable member are provided, one with an inclined surface and the other with an adjustable abutment co-operating with the inclined surface to retain the movable member in any required position by preventing movement thereof in one direction but allowing it to be freely moved in an opposite direction.

Referring to the drawings:—

Figure 1 is an elevation of a motor car wind screen with parts broken away.

Figure 2 is an enlarged sectional view on the line 2—2 in Figure 1.

Figure 3 is a similar view on the line 3—3 in Figure 1.

In the illustrated construction as applied to a wind screen joint, the movable member constituting the pivotal edge of the hinged panel 1 is formed as a tube or partial tube 2 which engages over a pivot member formed as a rod 3 extending transversely between the upper ends of the end pillars 4 of the wind screen frame. The upper edge and the ends of the panel 1 are mounted in channel members 5 and 6 respectively, the tube 2 being provided with a pair of parallel projecting webs 7 engaging one on each side of the channel member 5 and secured thereon by brazing or like means.

At two spaced points on the tubular member 2 are provided the inclined surfaces formed by projections 9, by means of which the panel 1 may be secured in any required angular position. The projections 9 are arranged eccentrically upon the tube 2, so as to provide an inclined surface 11 which is of gradually increasing height with respect to the tube 2. This inclined surface is curved to agree with the tube on which is is mounted. It will be understood that this surface 11 is not quite circular, but is nearly so. In a case where the tube 2 is $\frac{3}{4}$ of an inch in diameter, the cam surface 11 is a minimum height of say $\frac{1}{16}$ of an inch above the surface of the tube at 12 and increases gradually until at point 13, the surface 11 is at a maximum height, say $\frac{5}{32}$ of an inch above the tube 2.

The tube 2 and the projection 9 thereon are provided with a central slot 14 extending longitudinally of the inclined surface 11. Passing through this slot 14 and into a hole 10 in the fixed rod 3 situated inside the tube 2 is an operating device having a wing head 16. This operating device is adjustable within the hole 10, being screw threaded at 15 to engage with similar threads on the interior of the hole 10. Mounted on this screw 15 is an adjustable abutment member 17 having a part circular inner face 18 adapted to engage substantially throughout its length with the curved inclined surface 11. It will be obvious that the movable screw 15 may be replaced by a stud fixed in the rod 3 and having a nut movably mounted on its outer end to regulate the position of the abutment member 17.

As can be seen from Figure 2 or 3 it is impossible to move the panel 1 downwardly from its open position without adjusting the screw 15, since the abutment face 18 is fixed relative the axis of the rod 3 and the curved inclined surface 11 increases gradually in height from the said axis as you travel from top to bottom thereof. On the other hand, when it is desired to open the panel further, it is only necessary to give it a push and then screw up the screw 15, to lock the panel in the required new position.

The inclined surface 11 is so formed that any length of it which comes into contact with the part circular face 18 of the abutment member in any position of the panel 1, will engage with the said face 18 substantially throughout the length thereof, the large area of contact ensuring a good frictional grip. In this connection it is found that when the panel is locked in its down or closed position, and is pushed forwardly to open it, the panel will not fall back into its original position however far it may have been opened. If opened through 90° say, and then released, the panel will fall towards its closed position but will be brought gradually to a standstill by the frictional contact of the surfaces 11 and 18 at an inclination of about 30° to the vertical, although it can be pulled back to its vertical position without touching the screw 15.

This locking arrangement has thus the great advantage over previously constructed devices, that should the panel to which it is applied be inadvertently released while it is being pushed open, it is impossible for the panel to drop back into its vertical position with the consequent risk of breakage.

Further, it will be seen that when the panel is raised and locked or held in its raised position, it is possible to gradually lower or close the panel by merely turning the screw or other operating member so as to gradually retract the abutment member when the panel will automatically move into its closed position.

In the case of a top swinging panel in a wind screen the panel is usually required to swing only in advance of the plane of the stationary panel, but in the case of the lower panel, this may be required to swing both in advance and to the rear of the plane of the stationary plane.

The position of the inclined surface 11 on the tubular part 2 of the panel in relation to the screw 15 which is associated with the adjustable abutment 17 is arranged in accordance with the movement required for the panel.

In the case of a panel at the bottom of the screen hinged about its lower edge and adapted to swing both in advance and to the rear of the plane of the stationary frame, the highest part of the inclined surface will be in line with the screw carrying the adjustable abutment when the panel is in its rearmost position.

In the case of side panels swinging upon the vertical sides of the stationary frame the highest part of the inclined surface will be in line with the screw carrying the adjustable abutment when the panel is about at right angles to the plane of the stationary frame of the screen.

It will be observed that the present invention provides a means for locking a hinged panel in any position upon its pivot and furthermore, it effects this without placing any serious stress upon the tube at the edge of the panel and no extra space is required for additional clips upon the panel as is common with existing locking arrangements.

What I claim then is:—

1. A pivoted joint comprising a pivot member; a movable member mounted on said pivot member; an inclined surface on the movable member; an abutment member co-acting with said inclined surface to prevent movement of the movable member in one direction but allow it to be freely moved in an opposite direction, and an operating device associated with the pivot whereby the position of the abutment member can be adjusted to retain the movable member in any required position.

2. A pivoted joint comprising a pivot member having a hole therein; a movable member mounted on said pivot member and having an opening corresponding in position with the hole in the pivot member; an inclined surface on the movable member; an abutment member co-acting with said inclined surface to prevent movement of the movable member in one direction, but allow it to be moved in the other direction; and an operating device for said abutment extending through the opening in the movable member and adjustably mounted in the hole in the pivot member so that the abutment member can be moved thereby, to retain the movable member in any required position.

3. A pivoted joint comprising a pivot member having a tapped hole therein; a movable member mounted on said pivot member and having an opening corresponding in position with the hole in the pivot member; a curvilinear inclined surface on the movable member; an abutment member co-acting with said inclined surface to prevent movement of the movable member in one direction, but allow it to be moved in the other direction; and an operating device for said abutment member having a screw which passes through the opening in the movable member and engages with the threaded hole in the pivot member to enable the position of the abutment to be adjusted to retain the movable member in any required position.

4. A pivoted joint comprising a pivot member having a tapped hole therein; a tubular member rotatably mounted about said pivot and having an opening corresponding in position with the hole in the pivot member; a peripheral projection on the movable member having a curvilinear inclined surface; an abutment member co-acting with said inclined surface to prevent movement of the movable member in one direction, but allow it to be moved in the other direction; and an operating device for said abutment member having a screw which passes through the opening in the tubular member and engages with the threaded hole in the pivot member to enable the position of the abutment to be adjusted to retain the movable member in any required position.

In witness whereof I affix my signature.

JOHN THOMAS BROCKHOUSE.